Patented June 17, 1947

2,422,177

UNITED STATES PATENT OFFICE 2,422,177

PROCESS FOR BREAKING PETROLEUM EMULSIONS

Charles M. Blair, Jr., Webster Groves, Mo., assignor to Petrolite Corporation, Ltd., Wilmington, Del., a corporation of Delaware No Drawing. Application December 10, 1943, Serial No. 513,784

10 Claims. (Cl. 252—341)

This invention relates primarily to the treatment of emulsions of mineral oil and water, such as petroleum emulsions, for the purpose of separating the oil from the water. It is a continuation-in-part of my pending application for patent Serial No. 462,887, filed October 1, 1942.

One object of my present invention is to provide a novel process for resolving petroleum emulsions of the water-in-oil type, that are commonly referred to as "cut oil," "roily oil," and "emulsified oil," etc., and which comprises fine droplets of naturally-occurring waters of brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum, and relatively soft waters or weak brines. Controlled emulsification and subsequent demulsification, under the conditions just mentioned, is of significant value in removing impurities, particularly inorganic salts from pipeline oil.

The new composition of matter herein described, which constitutes the demulsifying agent of my improved process for resolving petroleum emulsions, constitutes a class of high molecular weight esters and ester acids together with their salts.

Reference is hereby directed to my aforementioned pending application for patent Serial No. 462,887, filed October 1, 1942. In said application it was pointed out that the condensation product of an alpha-beta ethylenic acid, or anhydride with an unsaturated, non-conjugated, non-hydroxylated fatty acid or fatty acid ester, constitutes a class of products having utility for breaking petroleum emulsions. In said application it was also pointed out that various derivatives of these condensation products are effective demulsifiers, and among such derivatives was mentioned the esters prepared by reacting the acidic condensation product with tertiary alkanolamines.

I have found that if one introduces a certain functional group or groups into the chemical compound or condensation product of an alpha-beta ethylenic acid or anhydride with an unsaturated, non-conjugated, non-hydroxylated fatty acid, one obtains a sub-genus or specie described in the above-mentioned pending application, which is decidedly effective for use as a demulsifier, as well as offering similar effectiveness for other purposes. In the present instance the invention is concerned with the sub-genus or species which contains a tertiary basic amino group in the form of an ester. Such functional group or radical appears to co-operate in some non-obvious manner with the remainder of the molecule to yield a product which is unusually effective as a demulsifying agent. Such type although disclosed in my aforementioned co-pending application, is not specifically claimed therein.

Briefly stated, such compounds are obtained by esterification of the adduct with basic tertiary alkanolamines containing at least one hydroxy group, such as triethanolamine. The amine may contain alkyl or alkanol radicals, in which the carbon chains may be interrupted by oxygen, or arylalkyl groups, in which the aryl radical is not linked directly to the nitrogen atom. Examples of suitable tertiary alkanolamines include tri-ethanolamine, butyldiethanolamine, diethylpropanolamine, benzyldiethanolamine, cetyldiethanolamine, cyclohexylethylethanolamine, and the like.

Such reactions of the kind just indicated, to wit, esterification, may result in a residual hydroxyl radical if the alkanolamine contains more than one hydroxyl group. As is hereinafter indicated, such hydroxyl radical may be esterified with various polycarboxy acids, as described, or with monocarboxy acids having 8 carbon atoms or less, such as octanoic, hexanoic, acetic, hydroxyacetic, lactic acid, etc. The acidic condensation product or adduct with which these tertiary alkanolamines are reacted has been completely described in the above mentioned application, but to make the present application complete within itself, these products will be described in detail.

As mentioned previously, these condensation products are themselves polybasic acids or anhydrides. It has recently been disclosed in U. S. Patents Nos. 2,188,882 to 2,188,890, inclusive dated January 30, 1940, to Clocker, and in "Oil and Soap" by Bickford, et al., in the February 1942 issue at pages 23 et seq., that these products may be obtained by heating the reactants at a suitably elevated temperature, usually above 200° C., and sometimes at temperatures above 300° C. The alpha-beta ethylenic acids or anhydrides which are suitable for use in this aforementioned condensation with non-conjugated, unsaturated, non-hydroxylated fatty acids, are those containing less than 10 carbon atoms, and are exemplified by crotonic acid, maleic acid, fumaric acid citraconic acid, glutaconic acid, acrylic acid, maleic anhydride, citraconic anhydride, etc.

Suitable non-conjugated, unsaturated, non-hydroxylated, fatty acids for use in condensation reactions with the above mentioned alpha-beta ethylenic acids, are those containing from 10 to 24 carbon atoms in their carbon chains, and include undecylenic acid, oleic acid, elaidic acid, linoleic acid, linolenic acid, erucic acid, dibasic diricinoleic acid, acetalized ricinoleic acid esters, etc.

Actually, as pointed out by Clocker in the above mentioned patents, the esters of these acids, such as the triglycerides or the esters of mono- or di- or other polyhydric alcohols, may be employed in this condensation, in place of the fatty acid itself. Esters of sorbitol, mannitol, sorbitan, mannitan, etc., may be used. For the production of demulsifiers contemplated by my process, I usually prefer to employ a condensation product derived from a glyceride containing in esterified form, a large proportion of non-conjugated, unsaturated, non-hydroxylated, fatty acid. Examples of such glycerides are olive oil, corn oil, cottonseed oil, soyabean oil, linseed oil, rapeseed oil, Perilla oil, cranberryseed oil, teaseed oil, etc.

When glycerides or other esters of the non-conjugated, unsaturated, non-hydroxylated fatty acids are employed in the condensation reaction, the final product is not necessarily a polybasic acid or anhydride, since a monocarboxy, alpha-beta ethylenic acid, such as crotonic acid, may have been employed in the condensation. However, such monobasic acid condensation products are intended to be included when reference is made to a polybasic carboxy acid or anhydride reactant used in preparing the demulsifiers contemplated by my present invention. Actually, they are the partial esters of dibasic acids, and under certain conditions, may function as polybasic acids by interchange of the alcohol residue with a hydroxyl-containing reactant. This aspect is clarified by contemplating the final product as derived from a polybasic carboxy acid, in which one carboxy radical is part of an unsaturated, non-conjugated, higher fatty acid, as described. The other carboxy radical or radicals are derived from the alpha-beta ethylenic acid.

For the sake of convenience and clarity, the reactants which are derived as described above by condensation of an alpha-beta ethylenic carboxy acid with a non-conjugated, unsaturated, non-hydroxylated, fatty acid or fatty acid ester, will be referred to below as Clocker adducts. Previous reference has been made to the fact that the functional group which characterizes the herein contemplated sub-genus or species, contains a tertiary basic aminoalkanol group, in which the alkyl or alkanol chains contain from 2 to 20 carbon atoms, triethanolamine being the most readily available source of such a grouping. The carbon atom chain may be interrupted by oxygen atoms.

The manufacture of typical Clocker adducts are illustrated by the following examples:

ACIDIC CLOCKER ADDUCT

Example A 880 lbs. of linseed oil was heated with 295 lbs. of maleic anhydride while stirring under an air condenser. The temperature was raised to 250° C. and held for 2 hours. Constant agitation was employed during the course of reaction. The progress of the reaction was noted by determination of the maleic anhydride number, i. e., the extent to which the maleic anhydride or its equivalent has disappeared by the formation of an adduct. See Berichte der Deutcher Chemishe Gesellschaft, vol. 70, part B, page 903, et seq. (1937), and Analyst, vol. 61, page 812 (1936). If the reaction is incomplete at the end of 2 hours, as indicated by any suitable analytical procedure, one continues heating and agitating until the reaction is complete, or substantially complete.

ACIDIC CLOCKER ADDUCT

Example B 880 lbs. of soyabean oil was heated with 196 lbs. of maleic anhydride while stirring under an air condenser. The temperature was held at 250° C. for 2 hours.

ACIDIC CLOCKER ADDUCT

Example C

Teaseed (olive) oil was substituted for the soyabean oil in Example B.

ACIDIC CLOCKER ADDUCT

Example D 232 lbs. of fumaric acid was substituted for the 196 lbs. of maleic anhydride in Example B.

ACIDIC CLOCKER ADDUCT

Example E 224 lbs. of citraconic anhydride was substituted for the 196 lbs. of maleic anhydride in Example B.

ACIDIC CLOCKER ADDUCT

Example F 300 lbs. of "Indusoil" (crude talloil acids) was heated at 250° C. for 2 hours with 150 lbs. of maleic anhydride.

ACIDIC CLOCKER ADDUCT

Example G 282 lbs. of oleic acid was heated with 98 lbs. maleic anhydride for two hours at 250° C.

ACIDIC CLOCKER ADDUCT

Example H 580 lbs. of sperm oil was substituted for the 880 lbs. of soyabean oil in Example B.

ACIDIC CLOCKER ADDUCT

Example I

In Examples A to H, preceding, the various oils were replaced by an equivalent weight of fatty acids, for instance, 880 lbs. of linseed oil was replaced by 842 lbs. of linseed oil fatty acids.

ACIDIC CLOCKER ADDUCT

Example J

Product of the kind described in Examples A to H, preceding, were saponified with a slight excess of caustic potash and then acidified with a slight excess of 50% sulfuric acid so as to yield products substantially identical with those described in Example I, preceding.

ACIDIC CLOCKER ADDUCT

Example K

The various glycerides previously described were replaced by an equivalent amount of esters derived from a low molal alcohol, for instance, the ester derived from methyl, ethyl, propyl, or butyl alcohols, or cyclic alcohols such as benzyl alcohols, cyclohexanols, etc. Such esters are obtained in the conventional manner by esterification between the fatty acids and the selected alcohol. As an example, 880 lbs. of linseed oil employed in Example A, preceding, were replaced by 1010 lbs. of the butyl ester of linseed oil fatty acid.

Having obtained the acidic Clocker adducts of the kind exemplified by the preceding examples, the next step consists in subjecting the same to an esterification or oxyalkylation process, thereby producing a new material, compound or product of which the following are examples:

COMPOSITION OF MATTER

Example 1

The Clocker adduct was prepared from linseed oil and maleic anhydride, as described in Example A. To 1175 lbs. of the adduct was added 900 lbs. of triethanolamine. The mixture was stirred and heated at a temperature of 200° for 3 hours. The product was a clear, viscous, red oil, soluble in dilute alkali, colloidally soluble in kerosene.

COMPOSITION OF MATTER

Example 2

The Clocker adduct was prepared from soyabean oil and maleic anhydride, as described in Example B. To 1075 lbs. of the adduct was added 600 lbs. of triethanolamine. The mixture was stirred and heated to a temperature of 250° for 4 hours.

COMPOSITION OF MATTER

Example 3

To 450 lbs. of the Clocker adduct prepared from Indusoil and maleic anhydride, as described in Example F, was added 450 lbs. of triethanolamine. The mixture was reacted as in Example 1 to yield a viscous oil, which was soluble in dilute alkalies and ammonia.

COMPOSITION OF MATTER

Example 4

The Clocker adduct prepared as described in Example C was substituted for the soyabean-maleic adduct of Example 2.

COMPOSITION OF MATTER

Example 5

1112 lbs. of the Clocker adduct, prepared as described in Example D, was substituted for the 1075 lbs. of soyabean-maleic adduct in Example 2.

COMPOSITION OF MATTER

Example 6

To 1140 lbs. of Clocker adduct, prepared from the free fatty acids, as in Example J, was added 450 lbs. of triethanolamine. The mixture was reacted as in Example 2.

COMPOSITION OF MATTER

Example 7

530 lbs. of ethyl diethanolamine was substituted for the 600 lbs. of triethanolamine in Example 2.

COMPOSITION OF MATTER

Example 8

Heat polymerized triethanolamine was substituted for the triethanolamine in Example 2.

The polymerized triethanolamine was prepared by heating triethanolamine at 250-300° C. for 4 hours in the presence of about 0.5% of its weight of sodium carbonate. Water in the amount of about 12% of the original weight of the triethanolamine was evolved and condensed during the reaction.

COMPOSITION OF MATTER

Example 9

Triethanolamine, heat polymerized triethanolamine, and ethyldiethanolamine, employed as reactants in prior examples, are first reacted with an alkylene oxide such as ethylene oxide in the ratio of three moles of $C_2H_4O$ for each available hydroxyl radical. Such etherized aminoalcohols are substituted in place of the reactant, as employed, without being subjected to the oxyalkylation step.

COMPOSITION OF MATTER

Example 10

Propylene oxide is substituted for ethylene oxide in the prior example.

COMPOSITION OF MATTER

Example 11

The proportion of alkylene oxide per hydroxyl radical is doubled in the two prior examples.

Reference to such esterification reaction of the kind previously described, contemplates that it shall be carried to completion, or substantial completion, from the standpoint of the desired ester. As will be pointed out hereinafter, such ester may be essentially a monomer, a dimer, a trimer, or higher polymer. Completion of reaction, or substantial completion, does not means that all available hydroxyl radicals need be eliminated by reaction with carboxyl radicals, if the latter are in excess or vice versa. Completion of the reaction may only involve the formation of a single ester linkage, i. e., the reaction of one carboxyl with one hydroxyl radical. In any event, the final product of reaction is sub-resinous or balsam-like in character.

Attention is directed to the fact that in the hereto appended claims reference to tertiary aminoalcohols is intended to include polyaminoalcohols, in which all the occurrences of nitrogen atoms are tertiary. Examples of such tertiary aminoalcohols are: Polymerized triethanolamine, tetraethanolethylenediamine, symmetrical diethanoldiethylethylenediamine, completely oxyethylated tetraethylenepentamine, and the like.

For other examples of suitable tertiary polyamino alcohols see Examples 9, 100 and 11 of U. S. Patent No. 2,306,329, dated December 22, 1942, to De Groote et al. See also completely oxyalkylated polyamines, such as those described in Examples 1 to 4, page 4, upper right hand column of U. S. Patent No. 2,324,490, dated July 20, 1943, to De Groote et al. Attention is directed additionally to another type of tertiary monoaminoalcohols, which are very suitable for use in preparing the present compositions. Such compounds are obtained by the oxyalkylation, particularly the oxyethylation, of certain aminohydroxy derivatives obtained from the low molal nitroparaffins. More specifically, reference is made to such compounds as are obtained by the oxyethylation of 2-amino-1-butanol, 2-amino-2-methyl-1-propanol, 2-amino-2-methyl-1,3-propanediol, 2-amino-2-ethyl-1,3-propanediol, and tris(hydroxymethyl)aminomethane in such a manner as to replace both amino hydrogen atoms with hydroxyethyl radicals. In these instances the hydroxymethyl group is the obvious chemical equivalent of the hydroxyethyl group. Additional oxyethylation will convert the hydroxymethyl group into a radical in which the terminal group is a hydroxyethyl radical. Oxyethylation of tris(hydroxymethyl)-aminomethane results in the formation of a compound in which there are present five hydroxyalkyl radicals. Polymerization of this last mentioned product in the manner described in respect to triethanolamine results in an equally desirable reactant.

Previous references were made to the fact that a carboxyl radical may be permitted to remain as such, i. e., in the unneutralized state, or may be neutralized in any suitable manner by means of a base such as caustic soda or the like, or by means of an amine. Similarly, any residual hydroxyl radical may remain as such, or be reacted with a low molal monocarboxy acid. Similarly, the hydrogen atom of residual or terminal hydroxyl radical may be replaced by a low molal alkyl radical.

In the broadest aspect then, the new composition of matter employed as the demulsifier of my process, is an esterified adduct being a member of the class consisting of complete esters, acid esters and ester salts; said adduct being an acylic alpha-beta unsaturated acid having not over 10 carbon atoms combined at an intermediate point in the carbon atom chain of a non-conjugated, unsaturated, non-hydroxylated, fatty acid acyl radical having at least 8 carbon atoms and not over 32 carbon atoms; said esterified adduct containing at least one occurrence of the radical

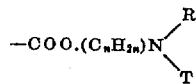

in which $n$ represents the numerals 2 to 20, and R and T represent alkyl, alicyclic, alkanol or arylalkyl groups. The $C_nH_{2n}$ radical, the alkyl radical and alkanol radical may have the carbon atom chain interrupted at least once by oxygen.

Examination of the preceding paragraph indicates that actually the scope is somewhat larger than this aspect. If one or both of the radicals R and T contain a hydroxyl group, then the alcoholic hydrogen atom may be replaced by a low molal acyl radical. Such acyl radicals include benzoic, methyl benzoic, and hydrogenated derivatives, i. e., alicyclic analogs.

The present products, since they contain basic amino groups, may, in the instances where the molecule contains unreacted carboxyl groups, constitute compounds of the so-called "zwitterion" type and may actually be innermolecular or intramolecular salts.

If desired, the amino groups of the present compounds may be neutralized with inorganic acids, such as hydrochloric acid, sulfuric acid, phosphoric acid, etc., or with low molecular weight organic acids, such as acetic acid, butyric acid, glycolic acid, lactic acid, phthalic acid, or the like. The solubility properties and surface activity of these reagents may be conveniently modified by such neutralization of the amino groups with selected acids.

A more narrow aspect and preferred aspect of the present invention is illustrated by examples where the hydroxyamine is polyfunctional. The adduct is always polyfunctional, due to the presence of anhydride radicals or ester radicals, insofar that either radical is in essence a combined or potentially available carboxyl radical. If a glyceride, for instance, linseed oil, is reacted with 3 moles of maleic anhydride, 6 potential carboxyl radicals are introduced into the molecule. Occasionally, more than 3 maleic anhydride radicals, and probably as many as 6 maleic anhydride radicals, can be so introduced. In any event, there is always a large plurality of carboxyl or potential carboxyl radicals present.

The tertiary alkanolamine, as previously described, may be considered for the sake of simplicity as just an ordinary alcohol, as far as esterification is concerned. Stated another way, one may temporarily ignore the amine function, and thus, the reactant may be considered as a monohydric alcohol or polyhydric alcohol. In the following discussion the term "alcohol" will be understood to include tertiary hydroxyamines.

If an alcohol is indicated by the formula $Y'(OH)_n$, where $n$ indicates the number 1 or more, and if a polybasic acid body be indicated by the formula $X'(COOH)_n$, where $n$ indicates the number 2 or more, then the reaction between a monohydric alcohol and a polybasic acid will result in a compound which may be indicated by the following formula: $YX(COOH)_{n'}$, wherein $n'$ indicates the number 1 or more, and which is in reality a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body is polybasic in nature, then examination reveals that the formula might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals; or there might be both. This is indicated by the following:

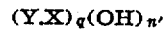

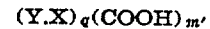

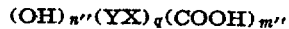

in which $q$ indicates a small hole number (one in the case of a monomer, and probably not over 20 and usually less than 10), and $m'$ and $n'$ indicate the number 1 or more, and $m''$ and $n''$ indicate zero or a small or moderately-sized whole number, such as zero, one or more, but in any event, probably a number not in excess of 40; for instance, as would be indicated by a molecule which involved 6 to 1 moles of a polyhydric alcohol. Naturally, each residual hydroxyl could combine with a dibasic adduct or with a similar compound, which is essentially a tribasic acid, if derived from an acid such as maleic acid; and in such event, there would be a large number of free or uncombined carboxyl radicals present, and especially, if derived from a trimaleated glyceride. Actually, the preferable type of reagent would be more apt to include less than 20, and in fact, less than 10 free hydroxyl radicals. It is not necessary to remark that the residual carboxyl radicals can be permitted to remain as such, or can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexanolamine, benzylamine, aniline, toluidine, etc. Conversion into the ester would be by means of a monohydric or polyhydric alcohol, such as methyl alcohol, ethyl alcohol, propyl alcohol, butyl alcohol, hexyl alcohol, octyl alcohol, decyl alcohol; ethylene glycol, diethylene glycol; glycerol, diglycerol, triethylene glycol, or the like. One could employ an amino alcohol so as to produce an ester.

If a tricarboxy acid, such as a maleic anhydride adduct, is employed, then at least theoretically three moles of the alcohol might react with one mole of the acid compound. Similarly, as has already been pointed out, a large number of molecules of such polybasic acid adduct might combine with a single molecule of a highly hydroxylated reactant. For practical purposes, however, we have found that the most desirable products are obtained by combinations, in which the ratio of alcoholic body to the polybasic acid is within the ratio of 3 to 1 and 1 to 5, and in which the molecular weight of the resultant product does not exced 10,000, and is usually less than 5,000, or perhaps less than 3,000. This is particularly true, if the resultant product is soluble to a fairly definite extent, for instance, at least 5%, in some solvent, such as water, alcohol, benzene, dichlorethyl ether, acetone, cresylic acid, or the like. This is simply another way of stating that it is preferable, if the product be one of the sub-resins, which are commonly referred to as an A resin, or B resin, as distinguished from a C resin, which is a highly infusible, insoluble resin (see Ellis, Chemistry of Synthetic Resins, 1935, page 862, et seq.).

In recapitulating what has been said previously, the sub-resinous, semi-resinous, or resinous product herein contemplated as the preferred type may be indicated by the following formula:

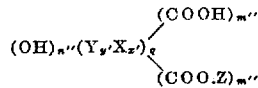

in which the characters have their previous significance, and $y'$ represents a small whole number not greater than 5, and $x'$ represents a small whole number not greater than 5; Z represents a hydrogen ion equivalent, such as a metallic atom, organic radical, etc.

When used as demulsifiers for petroleum emulsions, the products or materials herein described, may be employed as such, or in admixture with other demulsifiers, etc.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or compounds employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers or conventional mixtures thereof. It is believed that the particular demul-sifying agent or treating agent herein descri will find comparatively limited application, so as the majority of oil field emulsions are c cerned; but I have found that such a demuls ing agent has commercial value, as it will e nomically break or resolve oil field emulsion: a number of cases which cannot be treated easily or at so low a cost with the demulsify agents heretofore available.

In practising my process, a treating agent demulsifying agent of the kind above descri is brought into contact with or caused to act u the emulsion to be treated in any of the vari ways, or by any of the various apparatus 1 generally used to resolve or break petrole emulsions with a chemical reagent, the ab procedure being used either alone, or in combi tion with other demulsifying procedure, such the electrical dehydration process.

The demulsifier herein contemplated may employed in connection with what is commc known as down-the-hole procedure, i. e., bri ing the demulsifier in contact with the fluids the well at the bottom of the well, or at sc point prior to their emergence. This partict type of application is decidedly feasible when demulsifier is used in connection with acidifi tion of calcareous oil-bearing strata, especi: if suspended in or dissolved in the acid emplo for acidification.

It should be pointed out that acids and an drides are chemically equivalent, and that reference herein or in the claims to one or other is meant to include both the acid and corresponding anhydride.

In some of the above examples, adducts maleic anhydride with sperm oil have been e ployed. Chemical evidence indicates that reaction of maleic anhydride with esters of saturated, long chain alcohols, such as spe oil, involves the addition of maleic anhydride the chain or the alcohol in a manner analog to the addition of maleic anhydride to the ch of unsaturated, non-conjugated, non-hydr ylated fatty acids. Interesting demulsifiers r be prepared from the adducts of unsatura alcohols, such as oleyl acetate, oleyl stear: jojoba nut oil, alcohol esters, and the like, w maleic anhydride or other alpha-beta ethyle acids or anhydrides containing less than 10 car atoms. These products are prepared by the sa manufacturing methods described herein for present compounds and have utility in the sa arts and process as the derivatives of the saturated fatty acid adducts of the present plication. However, this application is not tended to cover compositions prepared from s adducts. Attention is directed to the co-pend application of Charles M. Blair, Jr., and Dale Schulz, Serial No. 513,785 filed December 10, 1!

Demulsification, as contemplated in the hei appended claims, includes the preventive step commingling the demulsifier with an aque component, which would or might subsequer become either phase of the emulsion, in abse of such precautionary measure.

Reference is made to my divisional applical Serial No. 547,817, filed August 2, 1944, whei the materials used as the demulsifier of my hei described process, are claimed as new comp tions of matter.

Having thus described my invention, wha claim as new and desire to secure by Lett Patent is:

1. A process for resolving petroleum emulsi of the water-in-oil type, characterized by subjecting the emulsions to action of a demulsifying agent comprising a sub-resinous esterified adduct, being a member of the class consisting of complete esters, acid esters and ester salts; said adduct being an acyclic alpha-beta unsaturated acid having not over 10 carbon atoms combined at an intermediate point in the carbon atoms chain of a non-conjugated, unsaturated, non-hydroxylated, fatty acid acyl radical having at least 8 and not over 32 carbon atoms; said esterified adduct containing at least one occurrence of the radical

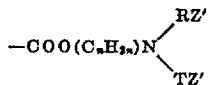

in which $n$ represents the numeral 2 to 20, R and T are selected from the class consisting of alkyl, alicyclic, alkanol and arylalkyl radicals, and Z' is a member of the class consisting of hydrogen atoms and acyl radicals having not over 8 carbon atoms.

2. A process for resolving petroleum emulsions of the water-in-oil type, characterized by subjecting the emulsion to the action of a demulsifier, comprising a sub-resinous esterification product of the formula type:

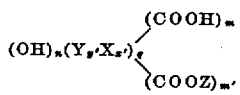

in which $y'$ represents a whole number not greater than 5, and $x'$ represents a whole number not greater than 5, and $n$, $m$, $m'$ indicate the numeral 0 to 40; $q$ indicates a small whole number not over 20; Z is a hydrogen ion equivalent; Y is an ester radical derived from an amino alcohol containing at least one occurrence of the radical

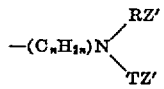

in which $n$ represents the numeral 2 to 20; R and T are selected from the class consisting of alkyl, alicyclic, alkanol and arylalkyl radicals, and Z' is a member of the class consisting of hydrogen atoms, and acyl radicals having not over 8 carbon atoms; and X is a carboxylic adduct radical; said adduct being an acyclic alpha-beta unsaturated acid having not over 10 carbon atoms combined at one intermediate point in the carbon atom chain of a non-conjugated, unsaturated, non-hydroxylated, fatty acid acyl radical having at least 8 carbon atoms and not over 32 carbon atoms.

3. The process of claim 1, wherein $n$ is the numeral 2.

4. The process of claim 2, wherein $n$ is the numeral 2, and the adduct being that of a polybasic alpha-beta unsaturated acid.

5. The process of claim 2, wherein $n$ is the numeral 2, and the adduct being that of a polybasic alpha-beta unsaturated acid having not over 6 carbon atoms.

6. The process of claim 2, wherein $n$ is the numeral 2, and the adduct being that of a polybasic alpha-beta unsaturated acid having not over 6 carbon atoms and in which Z is a hydrogen atom.

7. The process of claim 2, wherein $n$ is the numeral 2, and the adduct being that of a polybasic alpha-beta unsaturated acid having not over 6 carbon atoms and in which Z is a hydrogen atom and the fatty acyl radical has 18 carbon atoms.

8. The process of claim 2, wherein $n$ is the numeral 2, and the adduct being that of a polybasic alpha-beta unsaturated acid having not over 6 carbon atoms and in which Z is an hydrogen atom and the fatty acid acyl radical is a linoleyl radical.

9. The process of claim 2, wherein $n$ is the numeral 2, and the adduct being that of a polybasic alpha-beta unsaturated acid having not over 6 carbon atoms and in which Z is an hydrogen atom and the fatty acid acyl radical is a linolenyl radical.

10. The process of claim 2, wherein $n$ is the numeral 2, and the adduct being that of a polybasic alpha-beta unsaturated acid having not over 6 carbon atoms and in which Z is a hydrogen atom and the fatty acid acyl radical is an oleyl radical.

CHARLES M. BLAIR, Jr.

REFERENCES CITED

The following references are of record in the file of this patent:

UNITED STATES PATENTS

| Number | Name | Date |
| --- | --- | --- |
| 2,262,358 | De Groote et al. | Nov. 11, 1941 |
| 2,325,062 | Kritchevsky | July 27, 1943 |
| 2,188,888 | Clocker | June 30, 1940 |
| 2,214,784 | Wayne | Sept. 17, 1940 |
| 2,306,281 | Rust | Dec. 22, 1942 |
| 2,312,731 | Salathiel | Mar. 2, 1943 |
| 2,319,034 | Wayne, II | May 4, 1943 |